United States Patent [19]

Zwisler et al.

[11] 3,862,314

[45] Jan. 21, 1975

[54] PROCESS FOR ISOLATING THROMBOPLASTIC MATERIAL FROM HUMAN PLACENTAE

[75] Inventors: Oswald Zwisler, Marbach near Marburg/Lahn; Hans Joachim Biel, Marburg/Lahn, both of Germany

[73] Assignee: Behringwerke Aktiengesellschaft, Marburg/Lahn, Germany

[22] Filed: Aug. 22, 1972

[21] Appl. No.: 282,719

[30] Foreign Application Priority Data
Aug. 24, 1971 Germany................................ 2142343

[52] U.S. Cl................................. 424/105, 424/95
[51] Int. Cl................................. A61k 17/00
[58] Field of Search.............. 424/105, 106, 95

[56] References Cited
UNITED STATES PATENTS
1,314,321   8/1919   Fraenkel et al.................... 424/105
1,690,932   11/1928  Hartmann......................... 424/105
3,034,963   5/1962   Wachtel............................ 424/106
3,297,533   1/1967   Szent-Gyorgyi et al............ 424/95

FOREIGN PATENTS OR APPLICATIONS
820,787     11/1951  Germany.......................... 424/105
1,925,375   12/1970  Germany.......................... 424/105
963,466     5/1957   Germany.......................... 424/105
378,647     8/1932   Great Britain..................... 424/105
106,333     1/1927   Austria............................. 424/105

*Primary Examiner*—Sam Rosen
*Attorney, Agent, or Firm*—Curtis, Morris & Safford, P.C.

[57] ABSTRACT

A process for isolating a thromboplastic material from human placentae by solvent extraction techniques. A thromboplastic material, useful as a blood coagulant is obtained by this process.

1 Claim, No Drawings

PROCESS FOR ISOLATING THROMBOPLASTIC MATERIAL FROM HUMAN PLACENTAE

The present invention relates to a process for isolating thromboplastic material from human placentae, which material serves for improving the coagulability of the blood.

It is already known that thromboplastic material can be isolated from dried human brains by extraction with chloroform. However, owing to the shortage of this starting material, this process cannot be used for a large scale production. Furthermore, it is known to isolate thromboplastic material from rabbits' and bovine brains with the aid of acetone and chloroform. The yields of the described processes as well as the degree of purity and the activity of the isolated preparations were not satisfactory. The preparations have a poor activity, also with reference to the unit by weight, and they are in many cases not tolerated.

Now, we have found that an especially active thromboplastic material can be isolated from human placentae.

It is known that coagulation of the blood is initiated by thrombocytes. Disorders of the blood coagulation occur in the case of a thrombocyte deficiency, such as in thrombopenia, or when the thrombocytes have changed their function, a so-called thrombopathy, for example in the case of thrombasthenia.

The thromboplastic material obtained according to the invention is a lipid which is isolated from human placentae by extraction with organic solvents. It was not known hitherto that thromboplastic material occurs in placentae and that it can be isolated therefrom. The thromboplastic material obtained according to the invention is a homologous material which can be directly used by the physician. A preparation having this activity has hitherto not yet been described.

The preparation of the present invention offers the possibility of improving the intravenous injection the coagulability of the blood. It may also be used as a hemostatic for arresting the blood flow after operations, tooth extractions, etc., and in the case of thrombocyte deficiencies, for example thrombasthenia.

For isolating the thromboplastic material from placentae, the processes usually employed for isolating lipid fractions from tissues, for example the method described in German Pat. No. 820,787 may be used. Particularly good results are obtained when extracting the ground material of the placentae with an organic solvent which is miscible with water, for example acetone, dissolving the residue in a mixture of such a solvent and a solvent which is not miscible with water, for example acetone/chloroform, preferably at a ratio by volume of 1:1 to 3:1, discarding the undissolved matter, evaporating the solution, extracting it (suitably several times) with hot acetone, collecting the deposits after cooling the combined extracts, dissolving them in chloroform, extracting them by shaking with water to which a small amount of acetone had been added, evaporating the whole and bringing the residue into a form suitable for intravenous administration.

For the first extraction, which it is advantageous to carry out with acetone, 700 to 1,400 ml, preferably about 1,000 ml, of acetone per 1,000 ml of the ground placenta material are used.

The evaporated solution of the extraction with acetone/chloroform is extracted with 150 to 500 ml, preferably 330 ml of acetone (referred to 1,000 ml of starting material).

The activity of the preparation isolated according to the invention is measured by the test for the formation of plasma thrombokinose. This test is based on a two-phase method, wherein in the first phase plasma thrombokinase is formed with the aid of calcium ions and commercially available coagulation factors. In this phase thrombocyte factor 3 normally present is replaced by the preparation of the invention. The activity of the plasma thrombokinase formed in this first phase is then determined in a second phase in plasma which has been subjected to centrifugation at high speed and therefore has only a low number of thrombocytes. In this phase the active ferment thrombin is set free from the prothrombin present in the normal plasma, which in turn catalyses the convertion of fibrinogen into fibrin. Owing to fibrin formation, the plasma coagulates. This process proceeds within 10 to 15 seconds. Shortening of the coagulation time by some seconds indicates a considerable improvement of the activity of the preparation to be tested.

For testing the thromboplastic material prepared according to the invention, fresh human plasma was combined with an aluminum hydroxide suspension and centrifuged. By absorption on aluminum hydroxide, the coagulating factors VII, IX and X are eliminated to a large extent, so that the plasma contains mainly the factors VIII and V. 0.3 ml of this plasma pretreated by absorption were combined in a dilution of 1 : 5 with 0.3 ml of a serum dilution of 1 : 10 and 0.3 ml of the substance to be tested. In the test for the formation of thrombokinase usually the same amount of a suspension of human thrombocytes is added instead of the substances to be tested. Then, 0.3 ml of a m/40 calcium chloride solution is added, the whole is mixed and heated to 37°C. From this test batch, 0.1 ml is withdrawn at intervals of 1 minute, combined with 0.1 ml of a m/40 calcium chloride solution and this mixture is combined with 0.1 ml of a substrate plasma (substrate plasma is a commercially available human plasma which has been completely freed from thrombocytes). The coagulation time of this second batch is measured according to one of the usual laboratory methods.

A preparation produced according to the present invention and a preparation available in the commerce, prepared according to the method described in German Pat. No. 820,787, were compared in the above-described test. The following values were obtained:

9.5 seconds for the product of the invention
13.0 seconds for the known product (the measured values are scattered within the range of from 12.5 to 13.5 seconds).

Another method for testing the activity is the determination of the so-called Russel viper venom time (RVV). In this test, the coagulation factor X present in the plasma is activated by the venom of the snake *Vipera russeli*. The active form of the factor X binds, with the aid of calcium ions, onto thromboplastic material (lipid). Factor V adds additionally to the complex formed thereby. The lipid-enzyme-complex so-produced then cleaves prothrombin to thrombin which produces fibrinogen for coagulation. The time is determined which passes between the addition of calcium chloride to the described system and the setting-in of the coagulation. The more active with regard to coagulation the thromboplastic material is, the higher is the cleavage of prothrombin and the shorter become the times. In practice, the thromboplastic material in a dilution increasing gradually by the factor 10 is added to constant amounts of human plasma and venom of *Vipera russeli* and at a certain dilution a minimum time will be found.

A placenta lipid prepared according to the invention, is compared hereinafter with a lipid which had been prepared according to the method of the state of the art. Both time minimums were found to be at a dilution of 1 : 100. The time minimum of the placenta lipid prepared according to the invention is considerably lower than that of the lipid prepared according to the state of the art.

| Dilution | placenta lipid | lipid prepared according to the state of the art (German Patent No. 820,787). |
| --- | --- | --- |
| conc. | 105" | 105" |
| 1: 10 | 47.5" | 50" |
| 1: 100 | 42" | 49" |
| 1: 1000 | 52" | 57" |
| 1: 10000 | 75" | 82" |

The following example illustrates the invention:

EXAMPLE

Two human placentae were ground in frozen state. 1,000 ml of the material which was thawed out thereby were stirred for 1 hour at 20° C with 1,000 ml of acetone and then filtered. The filtrate was discarded. The filtration residue was stirred with 1,500 ml of acetone and 500 ml of chloroform for 15 hours at 20°C, filtered and the filtrate was evaporated at 40° – 50°C under reduced pressure. The lipid residue formed thereby was heated at the boiling point twice with 330 ml of acetone. Both extracts were combined and cooled to −20°C, C. Thereby the lipid precipitated; it was isolated by decanting off the solvent, dissolved in 25 ml of chloroform, covered with 600 ml of water and stirred for 1 hour. The chloroform phase was separated from the water in a extraction funnel, mixed with 10 ml of a mixture of one part of acetone and one part of water and stirred for 5 minutes with a vibration agitator. The suspension so formed was centrifuged for 20 minutes at 5,000 g. The layer which had accumulated at the top was withdrawn with precaution and the remaining chloroform lipid solution was evaporated under reduced pressure. The lipid freed from chloroform was dissolved in 20 ml of tetrahydrofuran and added dropwise to 90 ml of a 5 percent aqueous fructose solution having 40° – 45°C. The solvent was then removed at 40°C under reduced pressure. The whole was made up with water to a volume of 90 ml and the aqueous colloidal solution was adjusted to a pH-value of 6.5 by means of 0.1 N-hydrochloric acid and kept for 1 hour at 100°C. A weakly yellowish opalescent solution was obtained which showed a coagulation time of 9.5 seconds in the test for formation of thrombokinase.

We claim:

1. A process for isolating a thromboplastic material, which process comprises grinding frozen human placentae; extracting the ground material with acetone to leave a solid residue; dissolving the solid residue in a mixture of acetone and chloroform in a volume ratio between 1:1 and 3:1; discarding undissolved matter from the resulting solution; evaporating the solution to leave a solid; extracting the solid thus obtained with heated acetone; collecting the solid material which deposits from the extract upon cooling; dissolving said solid material in chloroform; extracting the chloroform solution by shaking with water; and recovering said thromboplastic material from the water-extracted chloroform solution.

* * * * *